Dec. 6, 1960 H. J. McCREARY 2,963,578

SIGNAL TRANSLATION APPARATUS EMPLOYING TRANSISTORS

Original Filed June 11, 1949 3 Sheets-Sheet 1

INVENTOR.
Harold J. McCreary
BY
Smith, Olsen & Baird
Attys.

INVENTOR.
Harold J. McCreary
BY
Smith, Olsen & Baird
Attys.

SIGNAL TRANSLATION APPARATUS EMPLOYING TRANSISTORS

Original Filed June 11, 1949

INVENTOR.
Harold J. McCreary
BY
Smith, Olsen + Baird
Attys.

2,963,578

Patented Dec. 6, 1960

2,963,578

SIGNAL TRANSLATION APPARATUS EMPLOYING TRANSISTORS

Harold J. McCreary, Lombard, Ill., assignor to Automatic Electric Laboratories, Inc., a corporation of Delaware Original application June 11, 1949, Ser. No. 98,606, now Patent No. 2,677,079, dated Apr. 27, 1954. Divided and this application Mar. 26, 1952, Ser. No. 278,724

5 Claims. (Cl. 250—20)

The present invention relates to signal translation apparatus employing transistors and more particularly to such apparatus in the form of frequency converters employed in superheterodyne radio receivers. The present application is a division of the copending application of Harold J. McCreary, Serial No. 98,606, filed June 11, 1949, now Patent No. 2,677,079, granted April 27, 1954.

It is the general object of the present invention to provide a frequency converter for a superheterodyne radio receiver that employs a transistor as the first detector therein.

Another object of the invention is to provide signal translation apparatus employing a tetrode transistor of improved construction and arrangement so as to facilitate the connection and arrangement of the related input and output circuits.

A further object of the invention is to provide in signal translation apparatus including a signal input circuit and an oscillator input circuit and an output circuit, a tetrode transistor of improved construction and arrangement accommodating the mixing of the signal frequency and the oscillator frequency, and eliminating capacitative feedback between the output circuit and the oscillator input circuit, while achieving feed-back between the output circuit and the oscillator input circuit to sustain self-oscillation of the oscillator.

Further features of the invention pertain to the particular arrangement of the circuit elements of the apparatus, whereby the above-outlined and additional operating features thereof are attained.

The invention, both as to its organization and method of operation, together with further objects and advantages thereof, will best be understood by reference to the following specification taken in connection with the accompanying drawings in which.

Figure 1:
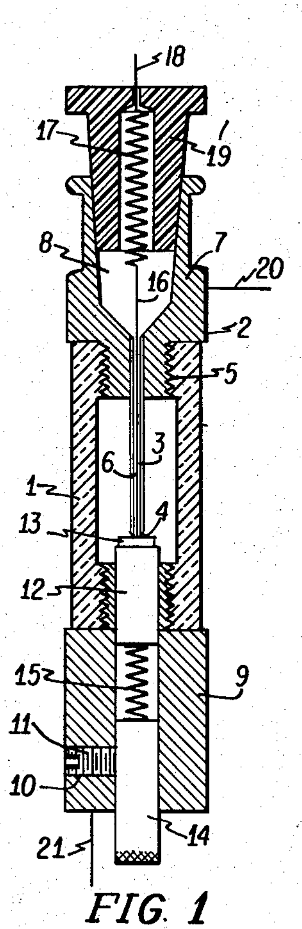
Figure 1 is an axial cross-sectional view of a concentric triode translating device or transistor.
Figure 2:
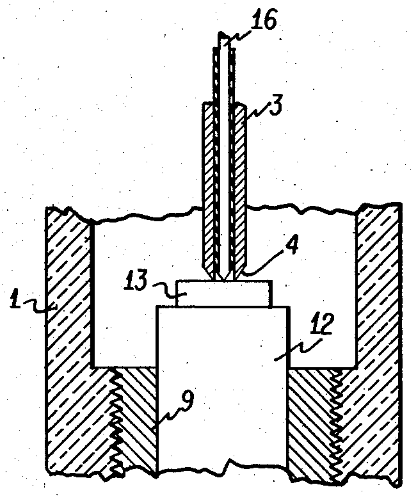
Fig. 2 is an enlarged cut away axial cross-sectional view of the triode device depicting the contact relation of the electrodes with the semi-conductive crystal thereof.

Referring now to Fig. 1 of the drawings for a detailed description of the triode translating device and its operation, an envelope defining a cavity therein for housing a semi-conductive crystal element is formed by a hollow cylinder or envelope 1 of insulating material, which is threaded on its interior at the opposite ends thereof. Into one end of the envelope 1 is threaded a metal sleeve 2 comprising essentially three steps of increasing diameter, the smallest diameter step or collector electrode 3 extending into the envelope 1 where it terminates in a sharply tapered annular or circular knife edge tip 4, the middle step 5 being threaded on its exterior to fit into the end of the envelope 1, and both of the steps 3 and 5 having a uniform small bore 6 which widens out in the largest step or shank end 7 into a mouth 8, the interior of which may or may not be threaded depending upon the type of plug to be fitted therein, which will be described later. A particular embodiment of the sleeve 2 may be a standard #28 hypodermic needle with a cannula 3, the part of the shank adjacent the cannula 3 being turned down and threaded, as indicated at 5, and the shank 7 being provided with the mouth 8, the cannula 3 being sharply tapered to the knife edge tip 4, the lumen 6 extending thru the cannula 3 and the threaded middle step 5, widening into the mouth 8 in the shank end 7. Into the other end of the envelope 1 is threaded a metal sleeve 9 containing a lateral tapped bore 10 for receiving a small set screw 11, the purpose for which will also be set out hereinafter. Into the sleeve 9 is slidably inserted a short brass rod 12 forming a base electrode, one end of which extends into the envelope 1; and mechanically and electrically fixed to the end of the short brass rod 12 is a semi-conductive element or crystal 13, a suitable embodiment of which may be a standard Sylvania 1N34 type germanium crystal. Rearwardly of the short brass rod 12 with relation to the envelope 1 and in the sleeve 9 is slidably inserted a brass control rod 14 one end of which protrudes so that it may be grasped between a person's index finger and thumb and moved in or out, as desired. Also within the sleeve 9 and between the short rod 12 and the control rod 14 is a compression spring 15. Movement of the control rod 14 inwardly will exert a force on the spring 15, which will, in turn, force the short rod 12 forwardly pressing the semi-conductive element 13 against the knife edge tip 4 of the collector sleeve or electrode 3 making annular or circular rectifying electrical contact therewith. The tip of the knife edge 4 of the cannula 3 may be copper plated and lightly wetted with mercury further to insure good electrical contact with the crystal 13. The set screw 11 is then threaded into the lateral bore 10 to provide a locking arrangement for the control rod 14, the circular rectifying electrical contact of the collector tip 4 with the semi-conductive element 13 being fixed and permanent. A fine thinly insulated nickel chrome emitter wire or electrode 16 provided with a ground pointed tip is fed down the small bore 6 of the sleeve 3, the diameter of the wire 16 plus the insulation thickness being substantially the same as the diameter of the bore 6, until the pointed tip thereof contacts the crystal 13. The portion of the emitter electrode 16 within the mouth 8 is now coiled into a spring 17 with the free end 18 thereof passing out of the mouth 8 and being used as a lead wire for a connection thereto.

A plug 19 of an insulating material, such as polystyrene or Polythene, is provided and shaped to fit the mouth 8 by force-fit or threading, as desired, the plug 19 being center bored throughout a portion of its axial length so as to encase the spring portion 17 of the emitter wire 16, the remaining length of the plug 19 being center bored to accommodate passage of the free end 18. When the plug 19, encasing the spring 17, is pressed into the mouth 8, the pointed tip of the emitter electrode 16 is pressed firmly into point rectifying contact with the crystal 13 and is firmly and permanently held in place. The point contact of the emitter electrode on the crystal 13 will then be permanently held in very close proximity with the circular knife edge contact of the tip 4 on the crystal 13 concentrically surrounding the emitter point, the distance of separation being at all points the radius of the emitter electrode 16 plus the thickness of the insulation thereon. At 18, 20 and 21, leads to the component elements of the triode translating device are indicated.

Figure 3:
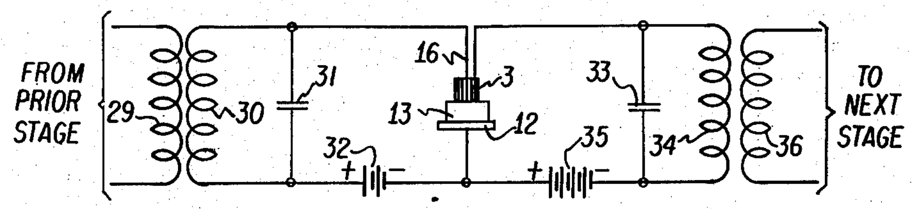
Fig. 3 is a schematic diagram of an intermediate frequency amplifying stage of a superheterodyne radio receiver incorporating the concentric triode device.

In Fig. 3 is shown a circuit depiction of an intermediate frequency amplifying stage of a superheterodyne radio receiver incorporating a triode transistor of the character described. The IF voltage from the previous stage is induced from the primary winding 29 of a transformer to the secondary winding 30 thereof. This IF frequency is then fed through the triode translating device hereinbefore described over an input circuit from the control electrode or emitter wire 16 through the tuned input tank circuit comprising a condenser 31 and a secondary winding 30, a battery 32, the base electrode 12, and through the crystal 13. Amplification occurs in the output circuit that may be traced from the collector electrode 3 through an output tuned tank circuit comprising a condenser 33 and a primary winding 34 of a transformer, a battery 35, the base electrode 12, and the crystal 13. The amplification gain realized thereby is impressed upon the secondary winding 36 of the transformer to feed into the next stage. The triode translating device may be similarly incorporated in the last or audio-amplifying stage of a superheterodyne radio receiver.

Figure 4:
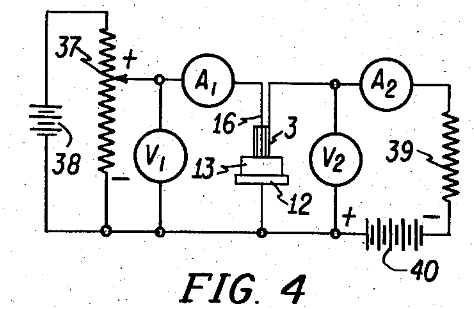
Fig. 4 is a test circuit for the concentric triode device that is provided with a potentiometer to vary the resistance in the input circuit and voltmeters and ammeters in the input and output circuits on which to read test data, the meters being labeled $A_1$, $V_1$ and $A_2$, $V_2$, respectively.

In Fig. 4 of the drawings is shown a test circuit having input and output circuits feeding into and out of the various elements of the concentric triode translating device. The input circuit may be traced from the control or emitter electrode 16 through an input ammeter $A_1$, a variable resistance potentiometer 37, a battery 38, the base electrode 12, and through the crystal 13. An input voltmeter $V_1$ is bridged across the emitter electrode 16 and the base electrode 12, potential for the input circuit being furnished by a battery 38. The output circuit may be traced from the collector electrode 3 through the output ammeter $A_2$, a fixed resistance 39, a battery 40, the base electrode 12 and through the crystal 13. Again, an output voltmeter $V_2$ is bridged across the collector electrode 3 and the base electrode 12. With the input voltage constant, input current is varied by changing the resistance by moving the arm of the potentiometer 37. That a gain is achieved in the output circuit is evidenced from a perusal of the data obtained by reading the output meters $A_2$ and $V_2$ and plotting the input readings against the output readings on the graphs in Figs. 5 to 7, inclusive.

Figure 5:
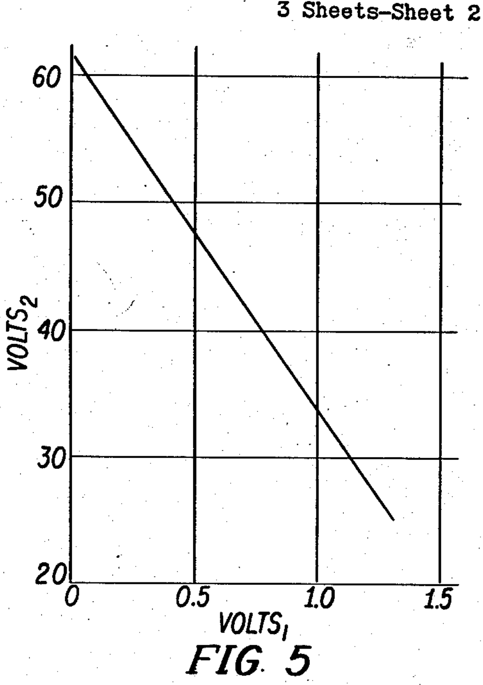
Figs. 5, 6 and 7 are graphs of test data obtained by varying the resistance in the circuit in Fig. 4 employing the potentiometer mentioned.

In Fig. 5 input voltage $V_1$ in volts is plotted as the abscissa while output voltage $V_2$ is plotted as the ordinate. As the input voltage was decreased from the vicinity of 1.5 volts to approximately 0.1 volt, the output voltage across the base electrode 12 and the collector electrode 3 as measured by the voltmeter $V_2$ increased from 20 to 60 volts. Since the battery 40 is always of smaller potential than the battery 38, this represents an appreciable output voltage increase or gain therein.

Figure 6:
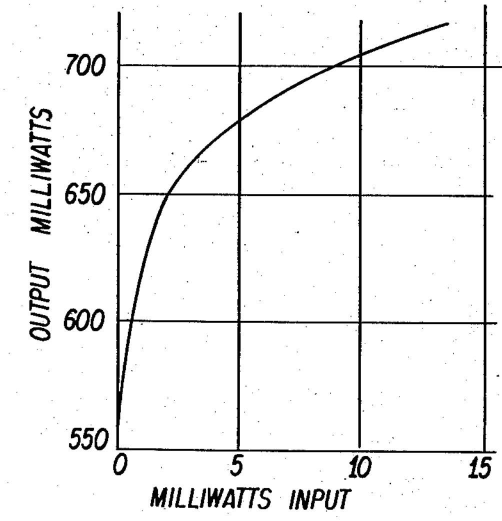

In Fig. 6, input power in milliwatts is plotted as the abscissa against power consumed by the load resistor 39, also in milliwatts, as the ordinate. Input voltage remained fixed and as the input resistance is increased by use of the potentiometer 37, the power may be computed by multiplying the resistance times the reading of the ammeter $A_1$ squared times 1000 to obtain results in milliwatts. As the graph shows, at low input power values, from 0–2 milliwatts, the output power rose sharply from 550 to the neighborhood of 650 milliwatts and then tapered off again evidencing power gain across the load resistor 39.

Figure 7:
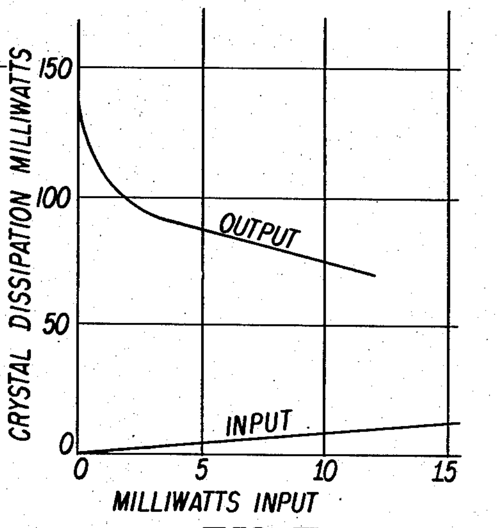

In Fig. 7 another graph of data obtained from readings on the meters of the test circuit shown in Fig. 4 is shown, power consumed in input circuit in milliwatts being plotted as the abscissa and power dissipation of the germanium crystal 13 in the output and input circuits being plotted as the ordinate. For an increase in power consumption in the input circuit from 0 to 15 milliwatts, the crystal dissipation in the input circuit increased linearly in the same neighborhood, approximately 15 milliwatts. However, for a small increase of from 0 to 2 milliwatts of power in the input circuit there is a sharp decrease in crystal dissipation in the output circuit from the neighborhood of 150 down to 100 milliwatts, beyond which point the dissipation tapers off almost linearly.

Figure 8:
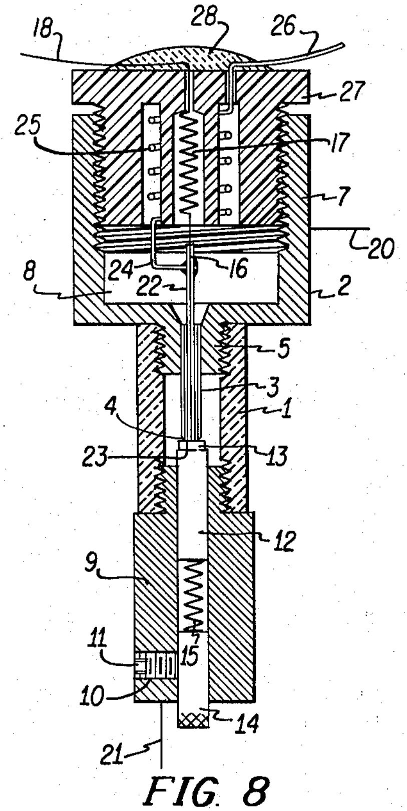
Fig. 8 is an axial cross-sectional view of a concentric tetrode translating device or transistor.
Figure 9:
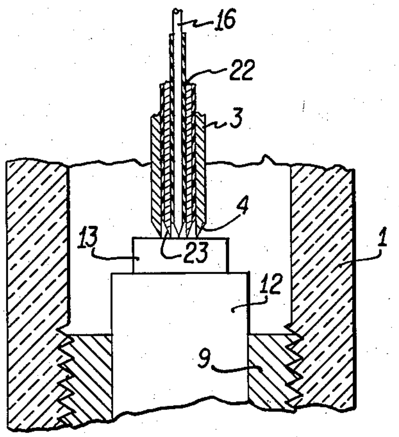
Fig. 9 is an enlarged cut away axial cross-sectional view of the tetrode device depicting the contact relation of the electrodes with the semi-conductive crystal thereof.

Referring now to Figs. 8 and 9 of the drawings for a detailed description of the structure and operation of the concentric tetrode translating device, many elements thereof will be seen to be common to the triode translating device hereinbefore described. Such common or equivalent elements will bear like numbers as this will readily facilitate the description. Therefore, it will be seen that the envelope 1, the three-step sleeve 2 (with the exception that the bore 6 of the steps 3 and 5 may, but need not be of a larger diameter than in the triode translating device), the tip 4, the shank 7, the mouth 8, the sleeve 9, the lateral tapped bore 10, the set screw 11, the short brass rod 12 with the semi-conductive element 13 mechanically and electrically attached to one end thereof within the envelope 1, the control rod 14, the compression spring 15, the emitter electrode 16, the spring portion 17 and the free end 18 thereof, and the leads 20 and 21, are of similar construction and like function. In addition to these common elements, a third sleeve 22 is provided that has on its exterior a fine coating of insulation, the contact end thereof being sharply tapered to a circular knife edge tip 23. The sleeve 22 is inserted in the bore 6 of the sleeve 2, with its tip 23 in rectifying contact with the crystal 13, its other end extending partially up into the mouth 8 of the shank 7, and attached thereto electrically and mechanically, as by soldering, is a nickel chrome wire 24, the diameter of which need not be as small as that of the emitter wire 16, the portion of the wire 24 within the mouth 8 being coiled into a spring 25 concentrically to envelop the spring portion 17 but of sufficiently larger coil diameter to allow ample space for an insulator therebetween, the free end 26 of the spring 25 continuing on out of the mouth 8 and being used as a lead wire for a connection. The tips of the knife edges 4 and 23 of the respective electrodes 3 and 22 may be copper plated and lightly wetted with mercury further to insure good electrical contacts with the crystal 13. The control electrode 16 will actually extend down the bore of the sleeve 22, which is interposed concentrically between the control electrode 16 and the collector electrode 3. In the tetrode translating device, the sleeve 22 is comparable, in some respects, to a screen grid of a vacuum tube containing an equal number of elements.

The plug 27, like the plug 19, is made of an insulating material, such as polystyrene or Polythene, and shaped to fit the mouth 8 either by force-fit or threading, and is center bored a portion of its axial length of a sufficient diameter to accept the spring portion 17 of the emitter electrode 16, the remainder of the plug 27 being center bored of a sufficient diameter to permit passage out of the free end 18. The plug 27 then has a second cavity therein concentric with the larger diameter center bore, of sufficient diameter to accept the spring portion 25 of the wire 24, with an insulating wall between the spring 17 and the spring 25, this wall being integral with the remainder of the plug 27. The plug 27 also has another small bore disposed in off-center relation and communicating with the concentric cavity to permit passage out of the free end 26 of the wire 24; and finally, a seal 28, formed of wax, cellulose cement or the like, is placed over the external end of the plug 27 and the free end leads 18 and 26 completely to render the translating device moisture and atmosphere proof.

Fig. 9 is an enlarged cut away view showing in greater detail the manner in which the concentric sleeves 3 and 22 are insulated one from another, how the ends thereof are tapered to circular knife edges 4 and 23, respectively, and the way in which these knife edges 4 and 23 make concentric rectifying contacts with the crystal element 13.

Figure 10:
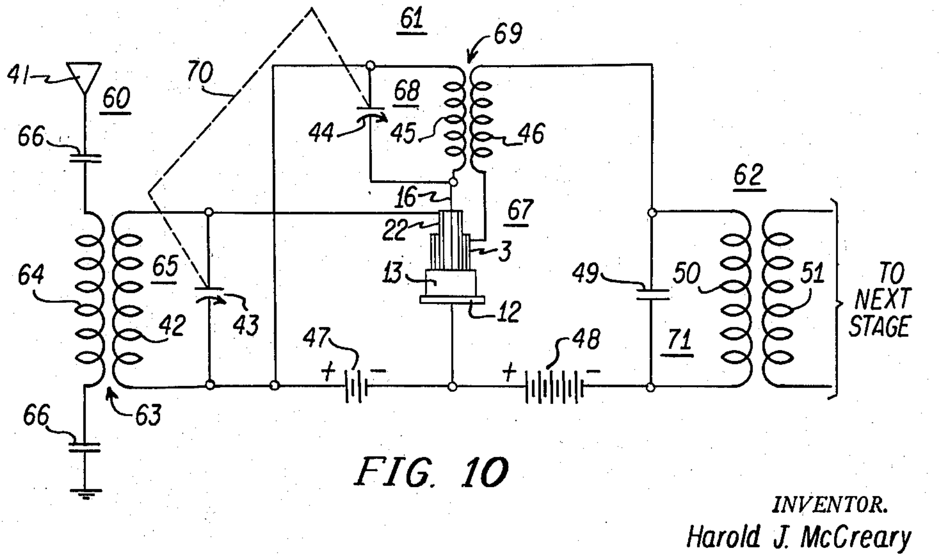
Fig. 10 is a schematic diagram of a portion of a superheterodyne radio receiver comprising a frequency converter incorporating the concentric tetrode translating device and embodying the present invention.

Referring now to Fig. 10, the portion of the superheterodyne radio receiver there illustrated and embodying the features of the present invention essentially comprises a signal preselector 60, a frequency converter 61, and a coupling device 62 operatively connected to the next or first intermediate frequency amplifier stage, which stage may take the form of that disclosed in Fig. 3 hereinbefore described. The signal preselector 60 includes an antenna 41, an antenna transformer 63 provided with a primary winding 64 and a secondary winding 42, and an input tuning circuit 65. The antenna 41 is connected to ground potential via the primary winding 64 of the antenna transformer 63 and a pair of coupling condensers 66 arranged at the extremities of the primary winding 64; and the input tuning circuit 65 takes the form of a tank circuit including the secondary winding 42 of the antenna transformer 63 and an associated adjustable condenser 43. The frequency converter 61 includes a tetrode transistor 67 of the construction hereinbefore described in conjunction with Figs. 8 and 9, as well as a heterodyne oscillator 68. As illustrated, the tetrode transistor 67 includes the crystal 13, the base electrode 12, the collector electrode 3, and the first and second control electrodes 22 and 16, respectively; while the heterodyne oscillator 68 takes the form of a tank circuit including the secondary winding 45 of a coupling transformer 69 provided with a primary winding 46, as well as an associated adjustable condenser 44. In the arrangement, the adjustable condenser 43 included in the input tuning circuit 65 and the adjustable condenser 44 included in the heterodyne oscillator are connected to be tuned in ganged relation, as indicated by the broken line 70. The coupling device 62 disposed between the frequency converter 61 and the first intermediate frequecy amplifier stage is in the form of a transformer provided with primary and secondary windings 50 and 51, respectively, and a tank circuit 71 formed by the primary winding 50 and an associated condenser 49, the tank circuit 71 being tuned to the intermediate frequency supplied from the frequency converter 61.

In the arrangement, the signal preselector 60 is connected via a bias battery 47 between the first control electrode 22 and the base electrode 12 so that a small forward bias is applied to the first control electrode 22 with respect to the base electrode 12. Similarly the heterodyne oscillator 68 is connected via the bias battery 47 between the second control electrode 16 and the base electrode 12 so that the small forward bias is also applied to the second control electrode 16 with respect to the base electrode 12. Finally, the coupling device 62 is connected via a supply battery 48 and the primary winding 46 of the coupling transformer 69 between the collector electrode 3 and the base electrode 12 so that a large reverse bias is applied to the collector electrode 3 with respect to the base electrode 12. Specifically, the bias battery 47 and the supply battery 48 may provide voltages of about 1 volt and 60 volts, respectively. Accordingly, the tetrode transistor 67 is provided with a first input circuit from the signal preselector 60 and including the first control electrode 22, a second input circuit from the heterodyne oscillator 68 and including the second control electrode 16, and an output circuit to the coupling device 62 and to the coupling transformer 69 and including the collector electrode 46. The signal preselector 60 is tunable over a given signal frequency band, and simultaneously the heterodyne oscillator is tunable over a predetermined frequency band displaced from the given signal frequency band by a fixed intermediate frequency. For example, the signal preselector 60 might be tunable over the signal frequency band extending from 550 kc. to 1500 kc., and the heterodyne oscillator 68 might be tunable over the corresponding predetermined frequency band extending from 1005 kc. to 1955 kc., so as to provide the fixed intermediate frequency of 455 kc.

In the operation of the apparatus, a RF signal $f1$ from the antenna 41 is supplied to the tank circuit 65 and impressed via the first input circuit upon the first control electrode 22, and the corresponding RF signal $f2$ is supplied by the heterodyne oscillator 68 and impressed via the second input circuit upon the second control electrode 16, whereby the RF frequencies $f1$ and $f2$ are mixed and amplified producing in the output circuit, including the collector electrode 3, the frequency components $f2$, $f1$, $f2+f1$, and $f2-f1$, wherein the frequency component $f2-f1$ is the intermediate frequency $f3$ to which the tank circuit 71 is tuned. Moreover since the frequency component $f2$ in the output circuit is in amplified form and traverses the primary winding 46 of the coupling transformer 69, self-oscillation of the tank circuit or superheterodyne oscillator 68 at the frequency $f2$ is sustained. While the coupling device 62 has a tendency preferentially to couple to the first intermediate frequency amplifier stage, the intermediate frequency $f3$ in the output circuit, due to the tuning of the tank circuit 71, the other frequency components mentioned are also supplied thereto. However, by proper filters in the first and succeeding intermediate frequency amplifier stages, the undesired frequency components of the output circuit may be readily eliminated; whereby there is produced the intermediate frequency $f3$ modulated with the desired signal from the antenna 41 so that after detection the desired signal may be amplified in the various audio frequency stages of the radio receiver and ultimately supplied to a loud speaker in the usual manner.

In passing, it is pointed out that the mixing of the RF signals $f1$ and $f2$ in the tetrode transistor 67 incorporated in the frequency converter 61 takes place in a very peculiar manner in that the wave shape of the amplified resultant in the output circuit seems to be established substantially entirely by the one of the control electrodes 22 or 16 to which is applied the larger forward bias rather than by a conjoint action thereof. In other words, it appears that the control of the tetrode transistor 67 is seized first by one and then by the other of the control electrodes 22 and 16 depending substantially entirely upon which of the control electrodes mentioned has applied thereto the larger forward bias, as the RF signals $f1$ and $f2$ are beat together. In any case, the output circuit contains the IF component $f3$ that comprises the difference between the RF components $f2$ and $f1$, whereby heterodyning is produced in the tetrode transistor 67, and the IF component $f3$ is supplied to the first intermediate frequency amplifier stage in an efficient manner. Moreover, since the first control electrode 22 occupies an interposed position with respect to the second control electrode 16 and the collector electrode 3 it effectively shields the second input circuit from the output circuit substantially preventing capacitative feed-back between the output circuit and the second input circuit, thereby preventing interference with the operation of the heterodyne oscillator 68 incorporated in the frequency converter 61.

The construction and arrangement of the triode and tetrode translating devices herein described are disclosed and claimed in the copending parent application of Harold J. McCreary, previously mentioned.

In view of the foregoing, it is apparent that there has been provided in a superheterodyne radio receiver, an improved frequency converter incorporating a tetrode transistor so that the radio frequency signals from the signal preselector and from the heterodyne oscillator are efficiently mixed to provide the intermediate frequency in amplified form to be supplied to the next or first intermediate frequency amplifier stage thereof.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. In a superheterodyne receiver including a signal preselector, a heterodyne oscillator, an intermediate frequency load, and means for tuning said preselector and said oscillator in ganged relation; the combination comprising a semi-conductive body, a base electrode making a low resistance contact with said body, a collector electrode and first and second control electrodes making corresponding rectifying contacts with said body, said collector electrode and said control electrodes being mutually insulated from each other and said rectifying contacts being mutually closely spaced with respect to each other, a first circuit connecting said preselector between said first control electrode and said base electrode, a second circuit connecting said oscillator between said second control electrode and said base electrode, and a third circuit connecting both said oscillator and said load between said collector electrode and said base electrode so as to sustain self-oscillation of said oscillator.

2. In a superheterodyne receiver including a signal preselector, a heterodyne oscillator, an intermediate frequency load, and means for tuning said preselector and said oscillator in ganged relation; the combination comprising a semi-conductive body, a base electrode making a low resistance contact with said body, a collector electrode and first and second control electrodes respectively making corresponding rectifying contacts with said body, said collector electrode and said control electrodes being mutually insulated from each other and said rectifying contacts being mutually closely spaced with respect to each other, a first circuit connecting said preselector between said first control electrode and said base electrode and applying a small forward bias to said first control electrode with respect to said base electrode, a second circuit connecting said oscillator between said second control electrode and said base electrode and applying a small forward bias to said second control electrode with respect to said base electrode, and a third circuit connecting both said oscillator and said load between said collector electrode and said base electrode and applying a large reverse bias to said collector electrode with respect to said base electrode so as to sustain self-oscillation of said oscillator.

3. In a superheterodyne receiver including a signal preselector tunable over a given signal frequency band, a heterodyne oscillator tunable over a predetermined frequency band displaced from said given signal frequency band by a fixed intermediate frequency, a load tuned to said fixed intermediate frequency, and means for tuning said preselector and said oscillator in ganged relation; the combination comprising a semi-conductive body, a base electrode making a low resistance contact with said body, a collector electrode and first and second control electrodes respectively making corresponding rectifying contacts with said body, said collector electrode and said control electrodes being mutually insulated from each other and said rectifying contacts being mutually closely spaced with respect to each other, a first circuit connecting said preselector between said first control electrode and said base electrode, a second circuit connecting said oscillator between said second control electrode and said base electrode, and a third circuit connecting both said oscillator and said load between said collector electrode and said base electrode so as to sustain self-oscillation of said oscillator at a tuned frequency within said predetermined frequency band.

4. A converter comprising a translating element having a body of semiconductive material, a base contact on said body, and three sharp contacts including a first, second and a third contact positioned in engagement with said body sufficiently close to each other to produce signal interaction within said body, a local oscillator including a resonant circuit, and a beat frequency circuit including an element of said oscillator and a load impedance connected in serious between said base contact and one of said sharp contacts, a connection between a second one of said sharp contacts and said local oscillator and an input signal source connected between the third of said sharp contacts and the base contact.

5. A converter including a translating element having a body of semiconductive material, a base contact thereon, and three sharp contacts thereon sufficiently close to each other to produce electrical interaction in said body, an input signal source of a first frequency connected between one of said sharp contacts and said base contact, a direct-current-conductive local oscillator circuit including a coil and a condenser connected in parallel and resonant at a frequency different from that of the signal source, said oscillator circuit being connected between a second one of said sharp contacts and base contact and including a direct-current supply biasing said second sharp contact positive with respect to said base contact, a direct-current-conductive load circuit having a parallel coil and condenser providing impedance at the frequency-difference between said signal source and said local oscillator frequency, said load circuit being connected between the third one of said sharp contacts and said base contact and including biasing means making said third sharp contact negative with respect to said base contact and a direct-current-blocking signal transmitting device coupling said load circuit to said oscillator circuit.

References Cited in the file of this patent

UNITED STATES PATENTS

| | | |
|---|---|---|
| 1,958,027 | Wheeler | May 8, 1934 |
| 2,049,677 | Urtel | Aug. 4, 1936 |
| 2,323,250 | Smith | June 29, 1943 |
| 2,476,323 | Rack | July 19, 1949 |
| 2,524,035 | Bardeen et al. | Oct. 3, 1950 |
| 2,569,347 | Shockley | Sept. 25, 1951 |
| 2,713,117 | Haegele | July 12, 1955 |

FOREIGN PATENTS

| | | |
|---|---|---|
| 506,781 | Belgium | Oct. 31, 1950 |

OTHER REFERENCES

The Transistor, Bell Telephone Laboratories, Inc., New York, N.Y., 1951, pages 127 to 164.